United States Patent Office 3,494,729
Patented Feb. 10, 1970

3,494,729
PROCESS FOR THE PRODUCTION OF
VANADIUM TRICHLORIDE
Robert Wendell Lerner, Adrian, Mich., and Hugh Raymond Letson, Sylvania, Ohio, assignors to Stauffer Chemical Company, New York, N.Y., a corporation of Delaware
No Drawing. Filed Aug. 18, 1967, Ser. No. 661,543
Int. Cl. C22b 55/00
U.S. Cl. 23—21   2 Claims

ABSTRACT OF THE DISCLOSURE

Vanadium trichloride is produced by chlorinating vanadium pentoxide with benzotrichloride.

---

This invention relates to a novel process for producing vanadium trichloride.

This compound as well as vanadium tetrachloride, which is readily produced via chlorination of the trichloride, is an important component of co-catalyst systems for olefin polymerization reactions.

Following conventional practice, vanadium trichloride is produced by a procedure involving dropping of powdered ferro vanadium through a heated stream of chlorine. The gaseous $VCl_4$ thus formed is passed through a salt column to remove $FeCl_3$ as the NaCl eutectic, whereafter it is dechlorinated to $VCl_3$.

The described process is exceedingly inefficient. Yields of even 40 percent of the $VCl_4$ intermediate are extraordinary. Moreover, the finely crushed ferro vanadium required for the process is often difficult to procure at an economical cost.

As indicated, the present invention has as a principal object the provision of a more efficient process which presents no problem of availability or cost in relation to the starting materials employed.

In accordance with the invention, vanadium trichloride is produced through the chlorination of vanadium pentoxide, benzotrichloride being employed as the chlorinating agent. With these reactants, yields of up to 95 percent are commonly afforded.

The new process can be carried out in conventional reactors, no special nickel alloy equipment being required. Also, the violent temperature excursions, hot spots and "burn-outs" experienced with the prior process do not occur.

The reaction on which the present process is based may be represented as follows:

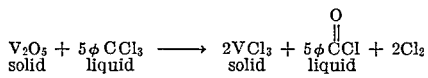

$$V_2O_5 + 5\phi CCl_3 \longrightarrow 2VCl_3 + 5\phi\overset{O}{\underset{\|}{C}}Cl + 2Cl_2$$
solid    liquid                    solid    liquid The $VCl_3$ product is obtained according to the invention in a less dense form, a distinct advantage in many applications. Certain other physical and chemical properties of the product appear below:

$VCl_3$ PRODUCT

Color _____ Purple, crystalline.
Molecular weight _____ 157.3.
Melting point _____ 6000° C. (disproportionates).
Specific gravity _____ 3.00.
Bulk density _____ 30 lbs./ft.³
Particle size _____ 2–25μ (major fraction 15–20μ).
ΔH_f 500° K _____ −138,100 cal./mole.

The reaction between the $V_2O_5$ and $\phi CCl_3$ is normally effected using stoichiometric quantities of the reactants. Heat is required initially to reach a temperature of 85°–100° C., whereafter an exotherm develops carrying the reaction mixture to a temperature of up to about 130° C. To complete the reaction, heat is again applied to attain a temperature of the order of 185°–200° C.

On completion of the reaction, the solid $VCl_3$ is separated from the reacted mixture by filtration and washed with a suitable solvent to free it of any unreacted $\phi CCl_3$ and/or

$$\phi\overset{O}{\underset{\|}{C}}Cl$$

Unreacted $V_2O_5$ is not present as a contaminant since the $V_2O_5$ is quantitatively consumed in the reaction. Solvents suitable for washing the $VCl_3$ product are, for example, alkanes such as pentane, hexane and heptane or mixtures of these. Also, methylene chloride and trichloroethylene are applicable. The volatility of such solvents, of course, aids in the subsequent drying of the $VCl_3$. Methylene chloride, likewise trichloroethylene, has the advantage that it reduces the fire hazard. In any case, where the solvent is added through the reactor, the latter should first be permitted to cool to a point below the solvent boiling point.

It is important that the reaction between the pentoxide and $\phi CCl_3$ be carried out in the substantial absence of air and moisture, otherwise a portion of the desired trichloride may become converted to vanadium trichloride hexahydrate and benzoic acid may form through oxidation of the benzoyl chloride by-product, causing filtering problems. For the same reason, the filtering and washing equipment should be so designed as to exclude air and moisture.

The following examples are submitted in illustration of the detailed practice of the invention.

EXAMPLE 1

$V_2O_5$ and $\phi CCl_3$ were mixed in a 0.1–0.5 gm. mole ratio in a 500 ml. flask. The contents were heated with stirring. At about 90° C. the reaction mixture underwent a pronounced evolution of gas accompanied by an exotherm carrying the reaction mixture to 130°. At this point the flask was heated to about 200° C. Solids that formed in the flask were isolated by filtration and washed with hexane. A purple residue remained. Analysis showed this to be $VCl_3$. The yield was 95 percent.

EXAMPLE 2

20 gms. of the $VCl_3$ product of Example 1 was placed in a pyrex boat which was inserted into a horizontal tube furnace. The furnace was heated to 300° C. with the contents under a nitrogen blanket. Chlorine was then introduced to replace the nitrogen. The chlorine flow rate was 0.76 gm./min., while the conversion rate to $VCl_4$ was 0.65 gm./min. Yield on the basis of the $VCl_3$ applied was 87.6 percent.

EXAMPLE 3

The experiment of Example 1 was repeated in larger scale.

To reduce the possibility of air contamination a 2-liter resin kettle was used as the reactor. Such kettle was fitted with a stirrer and a condenser to allow for operation at the reflux temperature of the

$$\phi\overset{O}{\underset{\|}{C}}Cl$$

by-product during the latter stages of the reaction. The reacted mixture was drained from the kettle through a bottom stopcock opening to a vertical 2″ tube having a porous disc at the bottom on which the $VCl_3$ was retained. The product was washed with dry hexane and thereafter dried by heating the tube and passing nitrogen therethrough.

In this run, the $V_2O_5$ was added as a dry powder to the preheated $\phi CCl_3$ (90° C.). The yield was 78 percent on the $V_2O_5$. Additions of the $V_2O_5$ were in small increments (10–20 gms.). This was found to keep the foaming due to the exotherm under control.

The invention claimed is:
1. Method of producing vanadium trichloride comprising reacting vanadium pentoxide and benzotrichloride in an essentially air and moisture-free environment, said method being further characterized in that the reactants are initially heated to a temperature of 85°–100° C. thereby to initiate an exotherm which carries the reaction mixture to a temperature of up to about 130° C., and the reaction mixture is subsequently heated to a higher temperature of the order of 185°–200° C. thereby serving to carry the reaction to produce vanadium trichloride to completion, and recovering the vanadium trichloride as the principal product of the reaction.

2. Method according to claim 1 when the product is recovered from the reacted mixture by filtration, the same being subsequently solvent-washed to free it of any benzotrichloride or benzoylchloride present therein, both the filtration and solvent-washing being carried out in an essentially air and moisture-free environment.

References Cited

UNITED STATES PATENTS

| | | | |
|---|---|---|---|
| 3,109,707 | 11/1963 | Lyons | 23—87 |
| 2,278,257 | 10/1966 | Tyree et al. | 23—87 XR |
| 3,355,244 | 11/1967 | Carter et al. | 23—17 |
| 3,374,053 | 3/1968 | Krettler et al. | 23—21 |
| 3,395,974 | 8/1968 | Berry | 23—21 XR |

FOREIGN PATENTS 897,187  5/1962  Great Britain.

EDWARD STERN, Primary Examiner

U.S. Cl. X.R.

23—87, 219; 260—544